Figure 1:
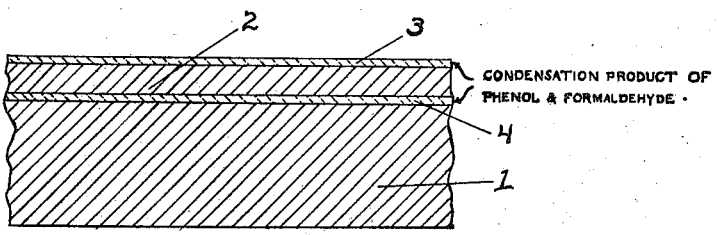

L. H. BAEKELAND & N. THURLOW.
WOOD FINISHING.
APPLICATION FILED APR. 30, 1909. RENEWED DEC. 21, 1911.

1,019,408.

Patented Mar. 5, 1912.

UNITED STATES PATENT OFFICE.

LEO H. BAEKELAND AND NATHANIEL THURLOW, OF YONKERS, NEW YORK, ASSIGNORS TO GENERAL BAKELITE COMPANY, OF NEW YORK, N. Y., A CORPORATION OF NEW YORK.

WOOD-FINISHING.

1,019,408.  Specification of Letters Patent.  Patented Mar. 5, 1912.

Application filed April 30, 1909, Serial No. 493,160. Renewed December 21, 1911. Serial No. 667,213.

*To all whom it may concern:*

Be it known that we, LEO H. BAEKELAND and NATHANIEL THURLOW, citizens of the United States, residing at Yonkers, in the county of Westchester and State of New York, have invented certain new and useful Improvements in Wood-Finishing, of which the following is a specification.

This invention relates to the production of articles consisting of or surfaced with wood or like fibrous or cellular materials, to which is applied a coating of a condensation product, specifically an insoluble and infusible synthetic condensation product resulting from the reaction under proper conditions of formaldehyde on phenol or a phenolic body.

The usual methods of finishing wood in the form of furniture or other shapes consists in first imparting to the same a smooth surface, to which is afterward applied one or several coats of varnish, each of which is sand-papered, polished and rubbed to secure a smooth and brilliant finish. This method involves long, tedious and difficult operations, which can be satisfactorily performed only by skilled workmen. For example, in finishing pianos, twelve days to three weeks may be required before the final coat can be applied, the intervening time being consumed in re-varnishing, drying and re-polishing. According to the present invention there may be produced upon wood or like fibrous or cellular bodies, in a few minutes and by a single operation, a finished coat which may be of any desired character or degree of brilliance, and which is harder, more durable and more resistant to the effects of moisture and chemical action than any coat or finish heretofore used. This coat contains as an essential component an insoluble and infusible condensation product of phenol and formaldehyde of the character described in the co-pending applications of L. H. Baekeland, Serial Nos. 358,156, filed Feb. 18, 1907, 383,684, filed July 13, 1907, 397,560, filed October 15, 1907, and 405,021, filed December 4, 1907. As fully explained in the said copending applications, there exist a wide variety of condensation products of phenol and formaldehyde, among which are certain partial reaction products which may be either liquid or solid and which present considerable variation with respect to solubility, these partial reaction products having in common the distinguishing property of undergoing transformation under the influence of heat into the insoluble and infusible condensation product. According to the present invention there may be applied to the surface of the wood an initial condensation product of the above type produced by reacting upon phenol with formaldehyde, in proper proportions, this product being applied either in a liquid or viscous state or in alcoholic or other solution. Or a mixture of approximately equal volumes of commercial formaldehyde and a phenolic body, to which a suitable condensing agent, preferably an alkaline substance may be added, can be applied to the surface of the wood and there react to yield the initial condensation product above referred to. This initial condensation product may form slowly at ordinary temperatures, or its formation may be hastened by slight heating. In whatever way the initial condensation product may have been applied, the wood is now slightly heated until after cooling it appears dry to the touch. The surface of the wood to be finished, assuming that a brilliant finish is desired, is then pressed against a perfectly smooth and hard surface, preferably a sheet of metal, as for example steel or brass properly polished and provided with a thin plating of nickel. During the operation of pressing, heat is applied, the temperature being raised sufficiently to transform the initial condensation product quickly into the final hard and insoluble condensation product. This operation is best performed in a so-called veneer press provided with heating means; such heating means may comprise a flame, or steam-heated platens, or any approved electrical or other heating device. Whatever source of heat be employed, it is advisable to conduct the operation at comparatively high temperatures. At temperatures of 150° to 200° C., the reaction whereby the soluble and fusible initial product is transformed into the insoluble and infusible final condensation product occurs quickly and may be completed under proper conditions in from ten to twenty minutes. The fact that these high temperatures may be safely used without injury to the wood is highly important for the economical and rapid practice of the method, and is probably due to the protective or sealing effect of the coating substance, maintained under pressure during the transformation. It is thus possible in a few minutes to provide a wooden surface with a gloss and finish which could heretofore be secured only at great expenditure of time and labor. Furthermore, the thin layer of the infusible and insoluble condensation product forms a hard surface which cannot be scratched by the nail, and which is capable of withstanding water, steam, alcohol and most chemicals. Not only is the surface highly ornamental in character, but by reason of the peculiar properties of the coating material there is imparted to the wood a higher degree of resistance to wear than has heretofore been obtained by any method, not excepting the laborious methods above referred to.

The procedure may be modified in various ways. For example, instead of pressing the coated wood against a smooth or plane surface, it may be pressed against a grained, dull or matte surface, or against any ornamental surface presenting a suitable design or relief to be imparted to the finished article. The process may also be modified as follows: The soft wood is impregnated with the initial condensation product in any of the ways above described, and during the act of finishing is compressed in such manner as to increase its density while at the same time imparting to it a surface polish or finish and any desired shape or configuration. The coating material may in all cases be colored as desired by the addition of dyes or pigments.

A highly advantageous embodiment of the process consists in coating veneer by dipping or otherwise with the initial condensation products or the materials that can engender them, and then applying the coated veneer to a wooden or other base, the condensation products serving not only as a finishing material for the exposed surface of the veneer but attaching the veneer in a far more effective manner than is possible with glue. The composite body is then inserted in the veneer press, and under the influence of heat and pressure the desired infusible and insoluble condensation product is produced. There is thus obtained not only the desired finish on the exterior surface of the veneer, but the veneer is firmly and permanently attached to the wood or base which it covers. The advantages of this method of procedure are obvious. The compound which binds the veneer to the wood is of such character that neither moisture nor solvents will affect or loosen it. The veneered article is for this reason far superior to the known products wherein the veneer is simply glued to the wood and afterward finished by the usual varnishing methods. The present method moreover involves but a single operation which is very quickly and economically performed. In the same way, a veneer or surface of wood can be applied to metallic or other bases, as for example to steel or aluminum plates, asbestos board or fabric, cement, stone or other incombustible supporting bodies. These non-combustible substances are thereby covered with a highly ornamental thin coating of veneer, forming articles which while possessing the appearance of highly ornamental wood are incombustible, far stronger and more durable than wood, and subject to none of its disadvantages.

Ceiling or wainscoting panels, parquet flooring, and like articles, can be made by applying a thin coat of wood or veneer on any desired support or base. In the case of ceilings or panels, the ornamental effect may be increased by imparting, during the act of finishing, any desired design or shape by embossing or otherwise. Similarly, the veneer may be applied to any stiff paper or pulp-board, and in order to increase the resistance of such pervious bases to moisture and atmospheric agencies, or to stiffen them, the paper or board may be impregnated with suitable substance, preferably the condensation product above mentioned; or the base may be strengthened by the use of metallic tension members, as for example wire netting.

In order to shorten the operation and to render it more practical, it is desirable to transform or harden the initial condensation product after it has been applied and before the act of pressing until it has assumed a semi-hardened state. In fact, it may be desirable to transform it into the so-called intermediate condensation product. This can be very simply effected by drying the coated article at a moderate temperature or by adding a suitable proportion of condensing agents until the condensation product has acquired a consistence which makes it sufficiently hard to proceed to the operation of pressing, but has not yet acquired the maximum hardness of the so-called final condensation product. The coated article is then subjected as above described to the joint action of heat and pressure, whereby the transformation into the final condensation product is very speedily effected.

The methods herein described are also applicable for finishing and imparting a durable and brilliant surface to materials having the essential characteristics, for the purposes of this invention, of wood, such for example as cardboard, pulpboard, paper or like fibrous or cellular bodies.

A product in accordance with this invention and a process of forming the product are diagrammatically illustrated in the accompanying drawing, wherein:—

Figure 2:
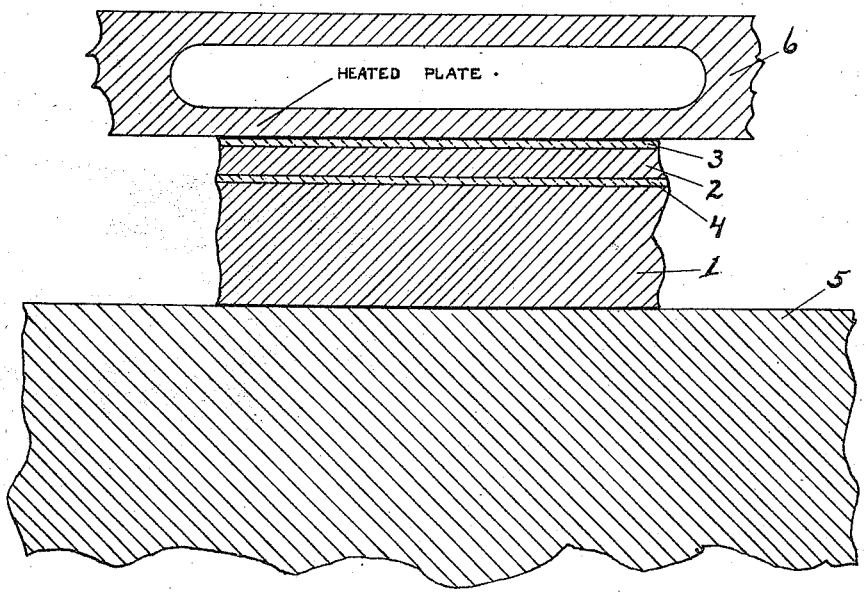

Figure 1 is a sectional view of a product in accordance with our invention; and Fig. 2 is a sectional view illustrating one method of forming the product.

In said drawing the numeral 1 represents a base of wood or other material, 2 a veneer of wood applied thereto, and 3 a superficial coating of the final condensation product of phenol and formaldehyde. A layer of the condensation product between the base and veneer is indicated at 4. In Fig. 2 the parts above described are illustrated as assembled upon a suitable support 5 and subjected thereon to pressure exerted between this support and the heated plate 6, having such finish as it is desired to impart to the surface of the completed article.

The word "phenol" as employed in the claims is intended to include such phenolic bodies as are the equivalents of phenol for the purposes of this invention, and the word "formaldehyde" is intended to include the polymers of formaldehyde.

We claim:

1. The method of finishing wood which consists in applying thereto a coating consisting essentially of a condensation product of phenol and formaldehyde which is capable of transformation under the influence of heat into an insoluble and infusible coating material, and then pressing the coated surface, with simultaneous application of heat, against a surface having the desired finish.

2. The method of finishing wood which consists in applying thereto a coating consisting essentially of a condensation product of phenol and formaldehyde which is capable of transformation under the influence of heat into an insoluble and infusible coating material, partially effecting this transformation, and then pressing the coated surface, with simultaneous application of heat, against a surface having the desired finish.

3. The method of attaching and finishing a veneer in a single operation, which consists in applying to the veneer a coating consisting essentially of a condensation product of phenol and formaldehyde which is capable of transformation under the influence of heat into an insoluble and infusible substance, and then pressing the coated veneer against the base to be veneered, with simultaneous application of heat, thereby simultaneously finishing the veneer and permanently securing the same to the base.

4. As a new article of manufacture, a base, and a veneer of wood therefor, said veneer attached to said base by means of an infusible and insoluble condensation product of phenol and formaldehyde, and having a surface coating thereof.

5. As a new article of manufacture, a non-combustible base, and a veneer of wood therefor, said veneer attached to said base by means of an infusible and insoluble condensation product of phenol and formaldehyde, and having a surface coating thereof.

In testimony whereof, we affix our signatures in presence of two witnesses.

LEO H. BAEKELAND.
NATHANIEL THURLOW.

Witnesses:
H. S. TARBELL,
MARY L. SHORT.